US006442389B1

(12) United States Patent
Marcum

(10) Patent No.: US 6,442,389 B1
(45) Date of Patent: Aug. 27, 2002

(54) METHOD AND APPARATUS FOR OPTIMIZING PARAMETERS OF A COMMUNICATION SYSTEM

(75) Inventor: Rodney Edward Marcum, Wheeling, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/337,080

(22) Filed: Jun. 21, 1999

(51) Int. Cl.$^7$ ................................................ H04Q 7/20
(52) U.S. Cl. ...................... 455/437; 455/438; 455/442; 370/331; 370/332
(58) Field of Search .................................. 370/332, 331, 370/333; 455/437, 438, 440, 442, 446, 436

(56) References Cited

U.S. PATENT DOCUMENTS

| | | | | |
|---|---|---|---|---|
| 5,812,540 A | * | 9/1998 | Bruckert et al. | 370/332 |
| 5,937,019 A | * | 8/1999 | Padovani | 375/358 |
| 6,038,448 A | * | 3/2000 | Chheda et al. | 455/436 |
| 6,154,653 A | * | 11/2000 | Jung | 455/442 |
| 6,160,798 A | * | 12/2000 | Reed et al. | 370/331 |
| 6,233,455 B1 | * | 5/2001 | Ramakrishna et al. | 455/437 |
| 6,301,234 B1 | * | 10/2001 | Lee | 370/331 |
| 6,337,984 B1 | * | 1/2002 | Hong et al. | 455/439 |

* cited by examiner

*Primary Examiner*—Lester G. Kincaid
*Assistant Examiner*—Temica M. Davis
(74) *Attorney, Agent, or Firm*—Sayed Hossein Beladi; Lalita P. Williams

(57) ABSTRACT

A communication system via the aid of a mobile station (195) and a computing device (150) determines value of an offset factor. Mobile station (195) measures a pilot signal strength transmitted from one of the base stations (160, 170, 180), changes value of the measured pilot signal strength according to the value of the offset factor, and reports the changed pilot signal strength in substitute of the pilot signal strength to one of the base station responsible for transmission of the pilot signal. Upon satisfactory performance, offset factor, at the base station, modifies the values of a common set of parameters that includes a threshold add and threshold comp to be used subsequently for all mobile stations.

12 Claims, 1 Drawing Sheet

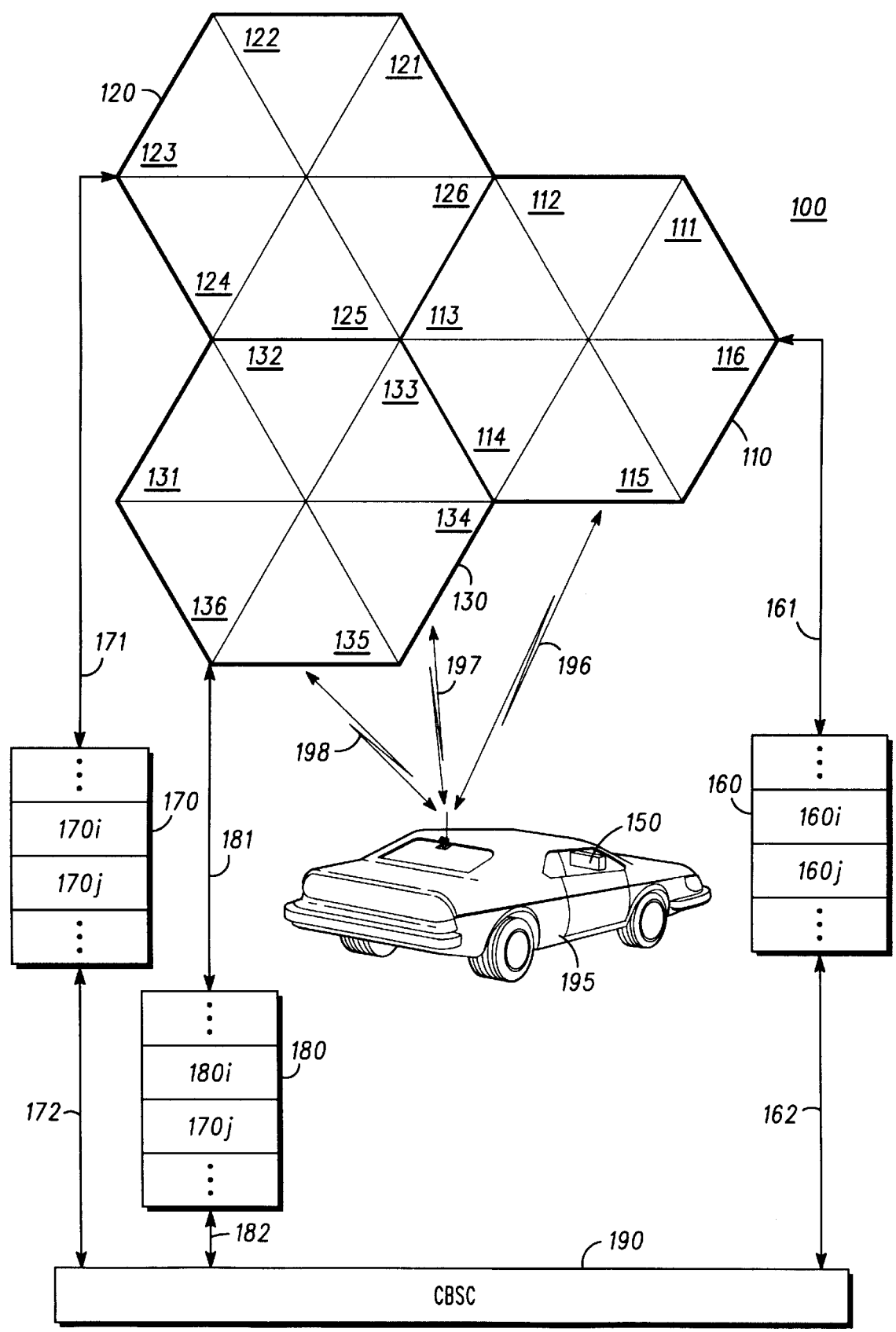

METHOD AND APPARATUS FOR OPTIMIZING PARAMETERS OF A COMMUNICATION SYSTEM

FIELD OF THE INVENTION

The present invention relates to communication systems, in particular, a code division multiple access communication system.

BACKGROUND OF THE INVENTION

System "optimization" refers to an activity of adjusting communication system operating parameters such that an optimal performance of the communication system is achieved. In a code division multiple access (CDMA) communication system, such parameters include cell site pilot power, neighbor lists for each sector, cell site access window (size), antenna down-tilt angles, and hand-off parameters. Handoff parameters include threshold-add (T-Add) and threshold-comparison (T-Comp) among other parameters. A mobile station measures a pilot signal strength and reports the result to the base station. The base station compares the pilot strength against a T-Add; if the value is above T-Add, the base station that transmitted the pilot signal is added to an active or candidate list in the mobile station. If the measured pilot strength value is above another pilot signal strength value already in the active or candidate list as much as the T-Comp value, the new base station replaces base station already in the list. One or more values of such parameters are stored in a database in the communication system.

A complex task of optimizing multiple interrelated variables starts during the initial system design phase. The next phase is an intense field optimization which starts after equipment and software are installed. Finally, after commercial operation starts, the system operators continue with an on-going optimization activity to adapt to changes in the coverage areas. Such a change may include a change in average number of users in the area as the result of the market expansions.

Currently the system optimization tasks involve heavy usage of iterative "drive-testing", an activity where engineers use a test subscriber mobile unit and drive by while making calls and collecting data. The data collected is analyzed to determine and resolve problems, and identify areas of potential improvement. The cost of optimization is proportional to the number of cell sites and sectors in the coverage area being optimized. The performance metrics for which a system is optimized usually includes: satisfactory coverage area, maximum access rate, minimal dropped calls, and best audio quality. After each run, the parameters of the communication system are changed while monitoring the effects of the changes. If the parameters with their new values provide an acceptable system performance, the new values for the parameters are stored in the system for operational use.

Changing database parameters is intrusive, and involves risk of entering erroneous data. Since all mobile stations are effected by the parameters, an erroneous entry may result in an overall system outages and shutdown. Moreover, determining new database parameters takes time. Modifying parameters via a drive testing involves driving through a route repeatedly until the desired results are achieved. Only one "set" of parameters may be modified at a time.

Therefore, there is a need for a method and apparatus that easily optimize the parameters of a communication system.

BRIEF DESCRIPTION OF DRAWING

FIG. 1 depicts a block diagram of a communication system network employing various aspects of the invention.

DETAILED DESCRIPTION OF THE PREFERRED EMBODIMENT(S)

According to one or more aspects of the invention a plurality of mobile stations use a common set of parameters to operate in a communication system. Such parameters may include threshold-add (T-Add) and threshold-comp (T-Comp). Threshold-add and threshold-comp parameters may be used in assisting the mobile stations performing handoff from one to another communication resource. At least one of the plurality of mobile stations measures signal strength of a pilot signal transmitted from a base station in the communication system. An offset factor is determined in the communication system. The mobile station changes the value of the measured pilot signal strength according to the value of the offset factor. The mobile station, furthermore, reports the changed pilot signal strength value in substitute of the measured pilot signal strength value to the base station responsible for transmission of the pilot signal.

Determining value of the offset factor may include subtracting value of an T-Add parameter from value of an optimized T-Add to determine value of the offset factor. The value of T-Add parameter is in a database of the common set of parameters. Furthermore, the base station compares the value of the reported pilot strength to the value of the T-Add parameter in the process of a routine operation in the communication system. This may include a handoff routine. The communication system, then, measures its performance according to at least one of the communication system metrics. If performance of the communication system pass a predefined criteria, the optimized T-Add value is substituted for the T-Add value in the database of the common set of parameters. As such, all mobile stations use the optimized T-Add value in operation with the communication system.

The value of the offset factor may be calculated by subtracting value of a T-Comp parameter from value of an optimized T-Comp. The Tcomp parameter is included in the common set of parameters. Furthermore, the base station compares value of the reported pilot strength to value of the T-Comp parameter. The communication system, then, measures its performance according to at least one performance metric. If the performance of the communication system pass a predefined criteria, the optimized T-Comp value is substituted for the T-Comp value in the common set of parameters. As such, all mobile stations use the optimized T-Comp value in operation with the communication system.

Handoff of a communication link from a first communication resource to a second resource is well known in the field of communication systems. There may be various types of handoff with various degrees of differences in operation and effects on the overall system processing capacity and performance. Hard handoff method, for example, involves transition between disjoint sets of base stations, different band of frequency assignments, different band of classes, or different frame offsets. Soft handoff normally involves transition from a first communication resource to a second one without disruption of the communication services, which may involve transition between different channels within the same frequency assignment.

Referring to FIG. 1, a communication system network 100 comprising of cells 110, 120 and 130 is shown where each cell has a sector arrangement. A communication network may have more or less number of cells or sectors. Cells 110, 120 and 130 each is shown to have six sectors, sectors 111–16, 121–26 and 131–36 respectively. Each cell is shown to have an associated base station transceiver (BTS), such as BTSs 160, 170 and 180 for respectively cells 110, 120 and

130. Each sector of a cell may have independent hardware and software resources in a BTS associated with the cell. Such resources may include directional antenna for each sector, amplifier, controller and controlling software. Resources for each sector is shown by way of segmenting each cell resources into segments 160-i through j, 170-i through j, and 180-i through j. A central base station controller (CBSC) 190 is shown to communicate with every BTS for overall control and operation of the network 100. Such control includes management of mobile stations communicating with the network 100 through various BTS resources. Such communication may be through backhaul connections 162, 172 and 182 for respectively BTS 160, 170 and 180.

In code division multiple access (CDMA) communication system, a network, such as network 100, may be assigned to one frequency channel. A CDMA system includes a coding scheme that allows multiple users to operate and communicate on different carrier signals all having the same frequency channels. The network may further include pilot signals. Each pilot signal may be coded according to a unique code, thus distinguishing the pilot signals. Normally, each sector has an assigned pilot signal. All mobile stations to communicate with a sector and obtain channel estimates may use the pilot signal from the sector; there may be other uses of the pilot signal. A set of communication channels, all having a common frequency assignment, normally is associated with a pilot signal. When a mobile station detects a pilot signal from a sector with sufficient strength, the mobile station reports the signal strength to a BTS. Such a BTS is normally associated with the cell that incorporates the sector which originated the pilot signal. The BTS then assigns a forward traffic channel (FWC) on the same sector to the mobile station and directs the mobile station for other tasks. Other task may include soft handoff from the first assigned sector to another.

A mobile station in a CDMA system searches for pilot signals to detect presence of an available communication channel by making signal strength measurement of the pilot signals. The signal strength and interference levels in combination may be compared against a threshold before accepting presence of an available communication channel. Such threshold may include T-Add and T-Comp. The mobile station monitors pilot signal level received from neighboring sectors and cells and reports to the network which pilot signal crossed a set of predefined or dynamic thresholds. Such thresholds may include T-Add and T-Comp. One of the sectors may be defined as the dominant sector and others around the dominant sector as the neighboring sectors. Normally, the mobile station identifies the dominant sector as the sector with strongest pilot signal or the sector that its transmitted traffic channel signal was received most strongly at the mobile station. Based on this report, the network orders the mobile station to add or remove channels from lists of channels commonly called an active set and candidate set, among other sets.

The information, targeted for a mobile station, modulated by appropriate code is sent from multiple sectors identified in the active set to the mobile station. The mobile station may then use the signals sent from the multiple sectors identified in the active set in a Rake receiver diversity combining method to improve its reception. The multiple sectors may be from a sector arrangement of the same cell or different cells. The active set contains identity of a set of sectors that are transmitting to the mobile station. Such identification may be in the form of identifying the pilot signals associated with the sectors. This method of adding and dropping channels from the active set for diversity combining is commonly referred to as soft handoff. When at least some of the multiple sectors in the handoff are from different sector of a common cell, the method of adding and dropping channels in the active set is commonly referred to as softer handoff.

The signal transmitted from a mobile station may be received and processed by the sectors that are included in the mobile station active set. The signals received at different sectors may be combined to improve reception. For example, a mobile station 195 is shown to be in a three-way handoff in network 100. Signals 197 and 198 are associated respectively with sectors 134 and 135 of cell 130, and signal 196 is associated with sector 115 of cell 110. Each signal is shown to be bidirectional. The mobile station 195 may combine all three signals, 196, 197 and 198 transmitted from the base stations to improve forward link reception. The CBSC 190 may instruct BTSs 160 and 180 to combine the received signals 196, 197 and 198 to improve reverse link reception. On the forward link, sectors in the soft or softer handoff each transmit a signal targeted for the mobile station. On the reverse link, the mobile station may transmit only one signal to be received possibly by all sectors involved in the handoff. The CBSC 190 involves all BTSs associated with each sector in the active set through backhaul connections 162, 172 and 182 to execute soft or softer handoff.

The mobile station 195 may be connected to a computing device (PC) 150, either internally or externally, to change the pilot signal strength value according to the offset value in order to evaluate its effect on the system performance. This has the effect of changing the T-Add and T-Comp for the mobile station without actually changing the thresholds in a database associated with one or more base stations. The mobile station 195 may travel the coverage areas several times before an acceptable offset factor is determined. Moreover, the mobile station may use different offset factor for each base station. In that case, for example, the mobile station 195 may use a first offset factor for communication 198, a second for 197, and a third for 196.

The PC 150 may provide an interface that allows choosing the mobile assisted handoff (MAHO) parameters for the mobile station, including the pilot strength measurement values. The PC 150 may calculate such parameters based on the measured data. A configuration file on the PC 150 provides a list of the new and old MAHO settings for each call connection. Such MAHO settings are finally entered into the database at the base station. The PC 150 may use the Mobility Manager's algorithm to compute the new MAHO parameter settings. The MAHO parameters may be a mix of parameter settings from the active sectors. Once the PC 150 computes the new MAHO parameters, it will compute offset factors for T-Comp and T-Add. The mobile station 195 may use MAHO parameters that have been changed by the PC 150 when the mobile station sends up a pilot strength measurement message (PSMM). This includes after adding or subtracting an offset value from the Ec/Io values of certain members of the pilots in the PSMM. The invention makes possible to "effectively" change database parameters for at least a mobile station without actually modifying the database. Accordingly, the invention allows multiple mobile users to use different sets of parameters. This may be equivalent to doing multiple drive tests using one set of parameters. The invention may also be used as a diagnostic monitoring tool to optimize the parameters of the communication system. The invention may not require any forward link messaging or global change of the infrastructure database. Parameter modification may be applied while the mobile station is testing an individual sectors, clusters, or possibly an entire system. This is made possible by instructing the mobile station to implement separate MAHO modifications while active on selected sectors, groups of sectors, or globally. During the optimization process, the parameters associated with a base station may be set at certain values that would effectively takes the base stations from being considered in the optimization process. This may include excluding certain base station from involving in handoff process.

What is claimed is:

1. A communication system that includes at least a base station and a plurality of mobile stations, wherein said plurality of mobile stations use a common set of parameters in said communication system to operate in said communication system, a method in said communication system comprising the steps of:

(a) measuring a pilot signal strength;

(b) determining value of an offset factor by subtracting value of an threshold-add parameter from value of an optimized threshold-add to determine value of said offset factor, wherein said threshold-add parameter is included in said common set of parameters;

(c) changing value of said measured pilot signal strength according to value of said offset factor; and (d) reporting said changed pilot signal strength in substitute of said pilot signal strength.

2. The method as recited in claim 1 wherein said measuring at step (a), said changing at step (c) and reporting at step (d) are performed by a first mobile station of said plurality of mobile stations.

3. The method as recited in claim 1 wherein a recipient of said reported said changed pilot signal strength is said base station responsible for transmission of said pilot signal.

4. The method as recited in claim 1 further comprising the steps of:

(e) comparing value of said reported pilot strength to value of said threshold-add parameter;

(f) measuring performance of said communication system after said step (e);

(g) substituting, when performance of said communication system measured in the step (f) pass a predefined criteria, said optimized threshold-add value for said threshold-add value in said common set of parameters in said communication system such that all mobile stations in said communication system are using said optimized threshold-add value in operation with said communication system.

5. A communication system that includes at least a base station and a plurality of mobile stations, wherein said plurality of mobile stations use a common set of parameters in said communication system to operate in said communication system, a method in said communication system comprising the steps of:

(a) measuring a pilot signal strength;

(b) determining value of an offset factor by subtracting value of a threshold-comp parameter from value of an optimized threshold-comp to determine value of said offset factor, wherein said threshold-comp parameter is included in said common set of parameters;

(c) changing value of said measured pilot signal strength according to value of said offset factor; and (d) reporting said changed pilot signal strength in substitute of said pilot signal strength.

6. The method as recited in claim 5 further comprising the steps of:

(e) comparing value of said reported pilot strength to value of said threshold-comp parameter;

(f) measuring performance of said communication system after said step (e); and (g) substituting, when performance of said communication system measured in the step (f) pass a predefined criteria, said optimized threshold-comp value for said threshold comp value in said common set of parameters in said communication system such that all mobile stations in said communication system are using said optimized threshold-comp value in operation with said communication system.

7. A communication system that includes at least a base station and a plurality of mobile stations, wherein said plurality of mobile stations use a common set of parameters in said communication system to operate in said communication system, an apparatus in said communication system comprising:

a) means for measuring a pilot signal strength;

(b) means for determining value of an offset factor by subtracting value of an threshold-add parameter from value of an optimized threshold-add to determine value of said offset factor, wherein said threshold-add parameter is included in said common set of parameters;

(c) means for changing value of said measured pilot signal strength according to value of said offset factor; and (d) means for reporting said changed pilot signal strength in substitute of said pilot signal strength.

8. The apparatus as recited in claim 7 wherein said means (a), said means (c) and said means (d) are incorporated in a first mobile station of said plurality of mobile stations.

9. The apparatus as recited in claim 7 wherein a recipient of said reported said changed pilot signal strength is said base station responsible for transmission of said pilot signal.

10. The apparatus as recited in claim 7 further comprising:

(e) means for comparing value of said reported pilot strength to value of said threshold-add parameter;

(f) means for measuring performance of said communication system after said step (e);

(g) means for substituting, when performance of said communication system measured by means (f) pass a predefined criteria, said optimized threshold-add value for said threshold-add value in said common set of parameters in said communication system such that all mobile stations in said communication system are using said optimized threshold-add value in operation with said communication system.

11. A communication system that includes at least a base station and a plurality of mobile stations, wherein said plurality of mobile stations use a common set of parameters in said communication system to operate in said communication system, an apparatus in said communication system comprising:

(a) means for measuring a pilot signal strength;

(b) means for determining value of an offset factor by subtracting value of a threshold-comp parameter from value of an optimized threshold-comp to determine value of said offset factor, wherein said threshold-comp parameter is included in said common set of parameters;

(c) means for changing value of said measured pilot signal strength according to value of said offset factor; and (d) means for reporting said changed pilot signal strength in substitute of said pilot signal strength.

12. The apparatus as recited in claim 11 further comprising:
   (e) means for comparing value of said reported pilot strength to value of said threshold-comp parameter;
   (f) means for measuring performance of said communication system in series with said means (e); and
   (g) means for substituting, when performance of said communication system measured by means (f) pass a predefined criteria, said optimized threshold-comp value for said comp-threshold value in said common set of parameters in said communication system such that all mobile stations in said communication system are using said optimized threshold-comp value in operation with said communication system.

* * * * *